United States Patent
Yang

(10) Patent No.: US 11,934,052 B2
(45) Date of Patent: Mar. 19, 2024

(54) VERIFICATION FIXTURE OF CURVED SCREEN

(71) Applicant: HUIZHOU CHINA STAR OPTOELECTRONICS DISPLAY CO., LTD., Guangdong (CN)

(72) Inventor: Baolei Yang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 17/433,014

(22) PCT Filed: Jul. 15, 2021

(86) PCT No.: PCT/CN2021/106583
§ 371 (c)(1),
(2) Date: Jan. 12, 2023

(87) PCT Pub. No.: WO2023/279422
PCT Pub. Date: Jan. 12, 2023

(65) Prior Publication Data
US 2024/0045241 A1 Feb. 8, 2024

(30) Foreign Application Priority Data
Jul. 6, 2021 (CN) .......................... 202110763022.3

(51) Int. Cl.
*G02F 1/13* (2006.01)
*G02F 1/13357* (2006.01)

(52) U.S. Cl.
CPC ...... *G02F 1/1309* (2013.01); *G02F 1/133608* (2013.01); *G02F 1/133606* (2013.01)

(58) Field of Classification Search
CPC ............. G02F 1/1309; G02F 1/133608; G02F 1/133606
See application file for complete search history.

(56) References Cited

U.S. PATENT DOCUMENTS

2019/0234588 A1* 8/2019 Lee .................... F21V 21/30

FOREIGN PATENT DOCUMENTS

| CN | 102243427 A | * | 11/2011 | ............. G03B 21/56 |
|----|-------------|---|---------|------------------------|
| CN | 102243427 A | | 11/2011 | |
| CN | 104197240 A | | 12/2014 | |
| CN | 104407461 A | | 3/2015 | |
| CN | 104676388 A | | 6/2015 | |
| CN | 105225614 A | | 1/2016 | |
| CN | 106205395 A | | 12/2016 | |
| CN | 107167867 A | | 9/2017 | |

(Continued)

OTHER PUBLICATIONS

English Machine Translation of Huang CN 102243427 (Year: 2023).*

*Primary Examiner* — Donald L Raleigh

(57) ABSTRACT

A verification fixture of a curved screen is disclosed. The verification fixture of the curved screen includes a support structure, a backlight module, and an adjusting module. The verification fixture of the curved screen can use the adjusting module to adjust positions of backlight blocks, thereby allowing the verification fixture of the curved screen to have curves having different target curvatures. Therefore, various backlight modules having different curvatures are not needed to assemble with display panels when performing a black screen test on the display panels.

20 Claims, 6 Drawing Sheets

(56) References Cited

FOREIGN PATENT DOCUMENTS

| | | |
|---|---|---|
| CN | 107883246 A | 4/2018 |
| CN | 207250029 U | 4/2018 |
| CN | 110095338 A | 8/2019 |
| KR | 102194099 B1 | 12/2020 |
| WO | 2018100699 A1 | 6/2018 |

* cited by examiner

VERIFICATION FIXTURE OF CURVED SCREEN

FIELD OF INVENTION

The present disclosure relates to the field of display technologies, and more particularly, to a verification fixture of a curved screen.

BACKGROUND OF INVENTION

Curved displays are more visually adaptable to human eyes, so attentions they received and popularity thereof are increasing year by year. Black mura caused by small curvatures has become a difficulty in designing curved screens. During research and implementation, the inventor of the present application finds that an existing solution is a trial-and-error comparison solution. That is, a plurality of test fixtures having different bending degrees are manufactured according to estimation and are assembled with display panels to compare a result of black mura. Then optimize a bending curve according to the result of black mura, and then manufacturing another test fixture, assembling, and verifying again until an acceptable degree is achieved. However, an optimal effect may not be obtained even making many comparisons, and a verification time period of this method is long, and costs are large.

Technical problem: an embodiment of the present disclosure provides a verification fixture of a curved screen, which can reduce a test time and the costs of black mura tests.

SUMMARY OF INVENTION

An embodiment of the present disclosure provides a verification fixture of a curved screen, which includes:

a support structure;

a backlight module disposed on the support structure and comprising a plurality of backlight blocks arranged in sequence, wherein light-emitting sides of two adjacent backlight blocks are connected to each other, and backlight sides of the two adjacent backlight blocks are separated from each other; and an adjusting module connecting the backlight module to the support structure and adjusting a bending degree of the backlight module.

Optionally, in some embodiments of the present disclosure, the backlight blocks include connecting parts and separation parts, the connecting parts are disposed on light-emitting sides of the separation parts, each of the connecting parts is disposed between two adjacent separation parts, the two adjacent separation parts are rotationally connected to each other by each of the connecting parts, and the separation parts and the connecting parts are an integrated structure.

Optionally, in some embodiments of the present disclosure, a connector is disposed between the two adjacent backlight blocks, and the two adjacent backlight blocks are rotationally connected to each other by the connector.

Optionally, in some embodiments of the present disclosure, the connector is a hinge structure.

Optionally, in some embodiments of the present disclosure, the adjusting module includes a plurality of adjusting blocks arranged in sequence, and the adjusting blocks are correspondingly disposed on two ends of the backlight blocks; and each of the adjusting blocks includes a first fixing part, a second fixing part, and an adjusting part, the first fixing part is connected to the support structure, the second fixing part is connected to the backlight blocks, and the adjusting part connects the first fixing part to the second fixing part and is configured to adjust a spacing between the first fixing part and the second fixing part.

Optionally, in some embodiments of the present disclosure, the adjusting part is one of a threaded part, a gear set, a telescopic rod, or scissor stays.

Optionally, in some embodiments of the present disclosure, the first fixing part includes a first connecting hole, the second fixing part includes a second connecting hole, the adjusting part is connected to the first fixing part by the first connecting hole and is connected to the second fixing part by the second connecting hole, and at least one of the first connecting hole or the second connecting hole is threadedly connected to the adjusting part.

Optionally, in some embodiments of the present disclosure, the first connecting hole is coaxial with the second connecting hole.

Optionally, in some embodiments of the present disclosure, each of the adjusting blocks further includes a circlip disposed on one side of the first fixing part or the second fixing part, and the circlip is sleeved on the adjusting part.

Optionally, in some embodiments of the present disclosure, the first connecting hole is a through-hole, the second connecting hole is a threaded hole, a nut is disposed on one side of the first connecting hole away from the second fixing part and configured to tighten or loosen the adjusting part, and the circlip is disposed on the side of the first fixing part.

Optionally, in some embodiments of the present disclosure, each of the backlight blocks includes a back frame, a reflective sheet, and a light source; the back frame includes a bottom plate and side walls, the bottom plate and the side walls form an accommodation space, and the reflective sheet and the light source are disposed in the accommodation space; and the reflective sheet is disposed on the bottom plate, and the light source is disposed on one side of the reflective sheet away from the bottom plate.

Optionally, in some embodiments of the present disclosure, in a gap between the two adjacent backlight blocks, reflective sheets corresponding to the two adjacent backlight blocks overlap each other.

Optionally, in some embodiments of the present disclosure, the backlight module further includes a diffusion sheet disposed on a light-emitting side of the backlight module and covering the backlight blocks with a whole surface.

Optionally, in some embodiments of the present disclosure, the verification fixture of the curved screen further includes a middle frame having a first side frame and a second side frame perpendicularly connected to each other, the first side frame is disposed on the side walls, the adjusting blocks penetrate through the first side frame to connect to the backlight module, the second side frame is disposed on one side of the backlight module away from the support structure, and a gap is defined between the second side frame and the backlight module.

Optionally, in some embodiments of the present disclosure, the adjusting module includes a plurality of adjusting blocks arranged in sequence, and the adjusting blocks are correspondingly disposed on two ends of the backlight blocks; each of the adjusting blocks includes a first fixing part, a second fixing part, and an adjusting part, the first fixing part is connected to the support structure, the second fixing part is connected to the backlight blocks, and the adjusting part connects the first fixing part to the second fixing part and is configured to adjust a spacing between the first fixing part and the second fixing part; and the second fixing part penetrates through the first side frame to connect to the backlight module.

Optionally, in some embodiments of the present disclosure, the backlight module includes a protruding part disposed in parallel to the second side frame, the protruding part is disposed on one side of the middle frame adjacent to the bottom plate, and the diffusion sheet is fixed between the protruding part and one end of the second fixing part.

Optionally, in some embodiments of the present disclosure, the bottom plate and the side walls are provided with continuous grooves, and the light source is attached into the continuous grooves.

Optionally, in some embodiments of the present disclosure, the verification fixture of the curved screen further includes a slide rail, a bearing, and an adapter bracket, the backlight module includes a bending side and a fixing side, a bottom bracket of the backlight module is fixedly connected to the slide rail, the slide rail is disposed in parallel to the bending side, the bearing is disposed in the slide rail, and the adapter bracket connects the fixing side and the bearing.

Optionally, in some embodiments of the present disclosure, the adapter bracket includes a first part and a second part, the first part is embedded into the bearing, and the second part is attached to the backlight module.

Optionally, in some embodiments of the present disclosure, the first part and the second part are an integrated structure.

Beneficial effect: the present disclosure provides the verification fixture of the curved screen. The verification fixture of the curved screen of the present disclosure can use the adjusting module to adjust the backlight blocks, thereby allowing the verification fixture of the curved screen to have curves having different target curvatures. Therefore, various backlight modules having different curvatures are not needed to assemble with display panels when performing a black mura test on the display panels. In addition, after a target curvature is set, the adjusting module can also be used to adjust a part of the backlight blocks in the verification fixture of the curved screen, thereby adjusting the backlight module to have multiple groups of curves when performing the black mura test on the display panels. Therefore, after comparing a result of back mura effects, it is not necessary to adjust the curves according to the result and to remake another backlight module having a curve with a different curvature. In addition, by adjusting the backlight blocks, the verification fixture of the curved screen provided by the present disclosure can determine an optimal bending curve. Therefore, the verification fixture of the curved screen provided by the present disclosure can shorten a verification time, reduce verification costs, realize a better verification effect, and obtain the optimal bending curve.

DESCRIPTION OF DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION OF PREFERRED EMBODIMENTS

Figure 1:
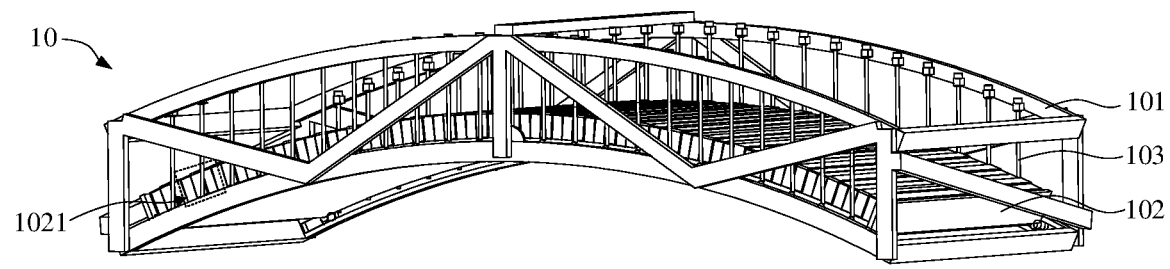
FIG. 1 is a first schematic structural diagram of a verification fixture of a curved screen according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure. In addition, it should be understood that the specific embodiments described herein are only used to illustrate and explain the disclosure, and are not used to limit the disclosure. In the present disclosure, in the case of no explanation to the contrary, the orientation words used such as "on" and "under" usually refer to upper and lower directions of the device in actual use or working state, specifically the directions in the drawings, and "inside" and "outside" refer to the outline of the device.

An embodiment of the present disclosure provides a verification fixture of a curved screen. It will be described in detail in the following. It should be noted that an order of description in the following embodiments is not meant to limit a preferred order of the embodiments.

Figure 2:
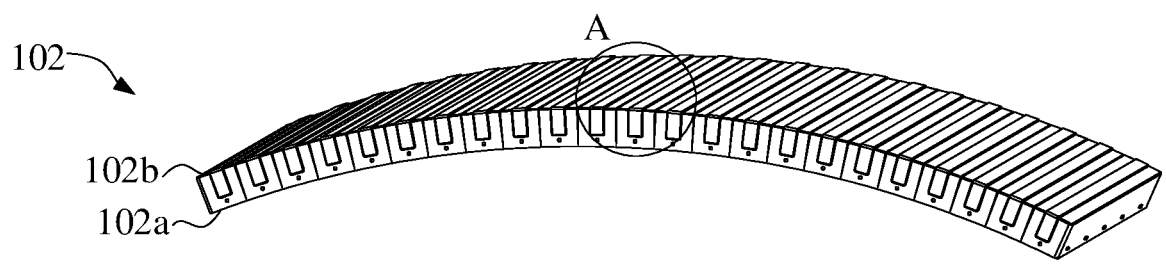
FIG. 2 is a first schematic structural diagram of a backlight module of the verification fixture of the curved screen according to an embodiment of the present disclosure.

Referring to FIGS. 1 and 2, FIG. 1 is a first schematic structural diagram of the verification fixture of the curved screen according to an embodiment of the present disclosure. FIG. 2 is a first schematic structural diagram of a backlight module of the verification fixture of the curved screen according to an embodiment of the present disclosure. The verification fixture 10 of the curved screen includes a support structure 101, a backlight module 102, and an adjusting module 103. The backlight module 102 is disposed on the support structure 101. The backlight module 102 includes a plurality of backlight blocks 1021 arranged in sequence. Light-emitting sides 102a of two adjacent backlight blocks 1021 are connected to each other, and backlight sides 102b of the two adjacent backlight blocks 1021 are separated from each other. The adjusting module 103 connects the backlight module 102 to the support structure 101. The adjusting module 103 adjusts a bending degree of the backlight module 102. Wherein, the verification fixture 10 of the curved screen provided in the present disclosure can perform a black mura test on a curved display panel, and the curved display panel may be a liquid crystal display panel (LCD).

First, disposing the curved display panel on the verification fixture 10 of the curved screen provided in the present disclosure. Then light up the backlight module 102. Setting a middle point, a leftmost point, and a rightmost point of the backlight module 102 to form an arc line having a target curvature. Under the premise that the target curvature remains unchanged, the adjusting module 103 is used to adjust the bending degree of the backlight module 102. Specifically, the adjusting module 103 adjusts positions of the backlight blocks 1021 excluding the three points to form a curve having different bending degrees, thereby verifying improvement effects of different curves on black mura.

Wherein, the backlight module 102 may also be preset to have a non-arc curve. That is, the middle point, the leftmost point, and the rightmost point of the backlight module 102 may be fixed, and one of points between the middle point and the leftmost point and between the middle point and the rightmost point may be fixed, thereby allowing a bending degree of a left side of the middle point is different from a bending degree of a right side of the middle point. Then the positions of the backlight blocks 1021 excluding the five points are adjusted to form the curve, and the improvement effects of different curves on black mura can be verified again. It should be noted that the backlight module 102 being bent to the non-arc curve mentioned above is only one example, and other non-arc curves such as an S-shaped curve may also be realized by the verification fixture 10 of the curved screen provided in the present disclosure.

Therefore, the verification fixture 10 of the curved screen provided in the present disclosure can realize different default curves to perform the black mura test on the curved display panel. The verification fixture 10 of the curved screen can adapt to a wider range of test requirements.

Specifically, the curved display panel may be attached to the verification fixture 10 of the curved screen by a double-sided foam glue. The double-sided foam glue has excellent compliance, buffering, and sealing properties, and superior bonding properties. The present disclosure can allow the curved display panel to attach to the backlight module to form a more fitting curve by the double-sided foam glue when performing the black mura test, thereby allowing a result of the black mura test to be more accurate.

The verification fixture 10 of the curved screen of the present disclosure can use the adjusting module 103 to adjust the positions of the backlight blocks 1021, thereby allowing the verification fixture 10 of the curved screen to have curves having different target curvatures. Therefore, various backlight modules having different curvatures are not needed to assemble with the curved display panel when performing the black mura test on the curved display panel. In addition, after a target curvature is set, the adjusting module 103 can also be used to adjust a part of the backlight blocks 1021 in the verification fixture 10 of the curved screen, thereby adjusting the backlight module 102 to have multiple groups of curves when performing the black mura test on the curved display panel. Therefore, after comparing a result of back mura effects, it is not necessary to adjust the curve according to the result and to remake another backlight module 102 having a different curve. In addition, by adjusting the backlight blocks 1021, the verification fixture 10 of the curved screen provided in the present disclosure can determine an optimal bending curve. Therefore, the verification fixture 10 of the curved screen provided in the present disclosure can shorten a verification time, reduce verification costs, realize a better verification effect, and obtain the optimal bending curve.

Wherein, in order to realize the backlight module 102 can be bent in a small range, the light-emitting sides 102a of the backlight blocks 1021 are connected to each other, and the backlight sides 102b of the backlight blocks 1021 are separated from each other. This setting can allow a part of the backlight module 102 to bend in the small range and can ensure integrity of entire structure and controllability of bending.

It should be noted that the backlight sides 102b of the backlight blocks 1021 being separated from each other means that the backlight sides 102b of the two adjacent backlight blocks 1021 may be separately disposed.

For example, when the backlight module 102 is not bent, a gap is defined between the backlight sides 102b of the two adjacent backlight blocks 1021, and there is no contact between the backlight sides 102b of the two adjacent backlight blocks 1021. When adjusting the bending degree of the backlight module 102, with rotation of the backlight blocks 1021, the backlight sides 102b of the two adjacent backlight blocks 1021 gradually move away from each other, that is, a degree of separation gradually increases.

Figure 3:
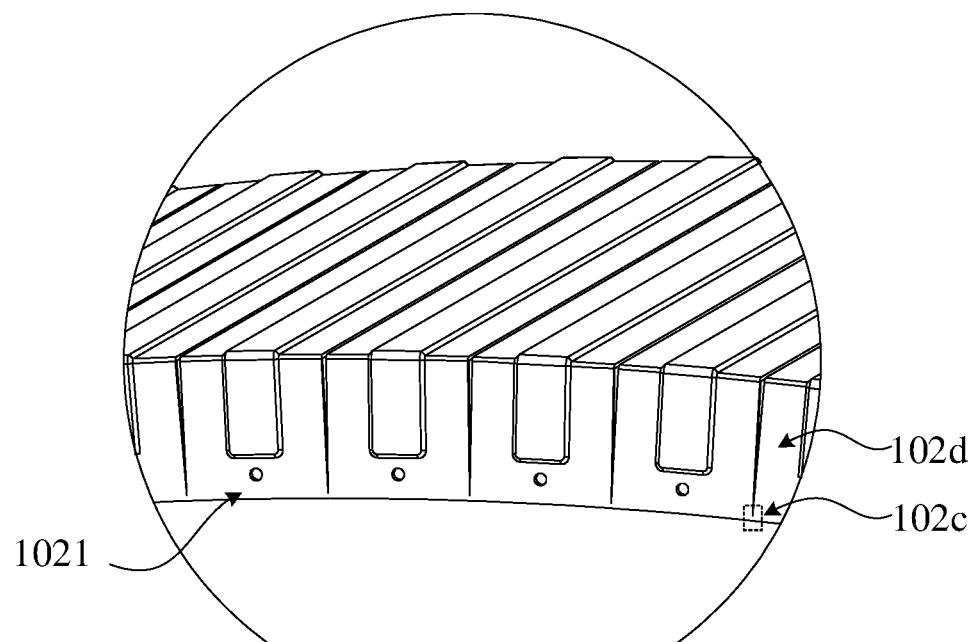
FIG. 3 is a schematic enlarged diagram of a site A in FIG. 2.

For another example, when the backlight module 102 is not bent, two adjacent backlight sides 102b may be in contact with each other or even overlap. When adjusting the bending degree of the backlight module 102, with rotation of the backlight blocks 1021, the backlight sides 102b of the two adjacent backlight blocks 1021 gradually move away from each other, thereby realizing separation from each other. Referring to FIGS. 2 and 3, FIG. 3 is a schematic enlarged diagram of a site A in FIG. 2. The backlight blocks 1021 include connecting parts 102c and separation parts 102d. The connecting parts 102c are disposed on the light-emitting sides 102a of the separation parts 102d. Each of the connecting parts 102c is disposed between two adjacent separation parts 102d. The two adjacent separation parts 102d are rotationally connected to each other by each of the connecting parts 102c. The separation parts 102d and the connecting parts 102c are an integrated structure.

Applying the backlight module 102 shown in FIG. 3 to the verification fixture 10 of the curved screen can simplify a manufacturing process of the backlight module 102. In addition, since the separation parts 102d and the connecting parts 102c of the backlight blocks 1021 are the integrated structure, integrity of the light-emitting sides 102a and flatness of a light-emitting surface can be ensured. In addition, the connecting parts 102c on the light-emitting sides 102a connect the backlight blocks 1021 together, so it can prevent the backlight blocks 1021 from relative displacement when the bending curve of the backlight module 102 is adjusted.

Figure 4:
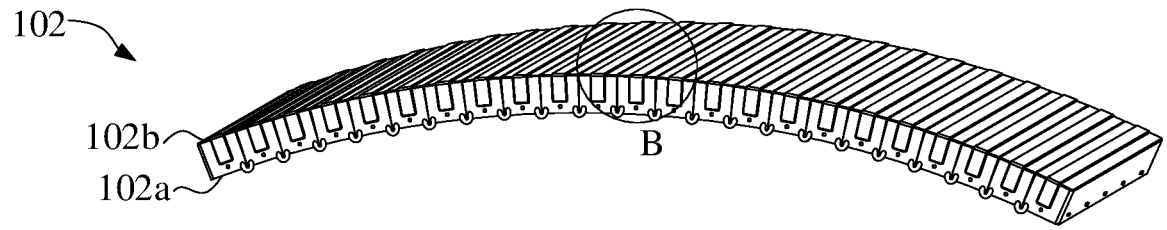
FIG. 4 is a second schematic structural diagram of the backlight module of the verification fixture of the curved screen according to an embodiment of the present disclosure.
Figure 5:
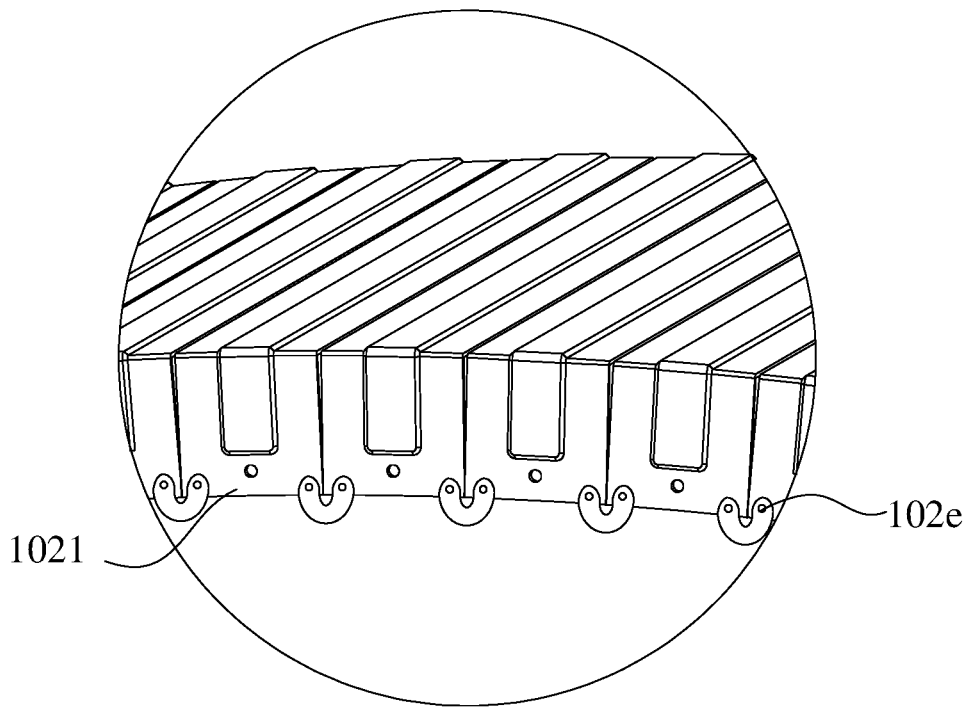
FIG. 5 is a schematic enlarged diagram of a site B in FIG. 4.

Referring to FIGS. 4 and 5, FIG. 4 is a second schematic structural diagram of the backlight module of the verification fixture of the curved screen according to an embodiment of the present disclosure, and FIG. 5 is a schematic enlarged diagram of a site B in FIG. 4. Wherein, a connector 102e is disposed between the two adjacent backlight blocks 1021, and the two adjacent backlight blocks 1021 are rotationally connected to each other by the connector 102e.

Specifically, the connector 102e may be a hinge structure. A hinge is a mechanical device configured to connect two solids and allow the two solids to have relative rotation, and the hinge may be composed of movable components or foldable materials. In the present disclosure, the connector 102e uses the hinge structure to connect two of the backlight blocks 1021, thereby allowing the backlight module 102 to be able to bend at a larger degree and allowing the bending curve to be more convenient to adjust.

Figure 6:
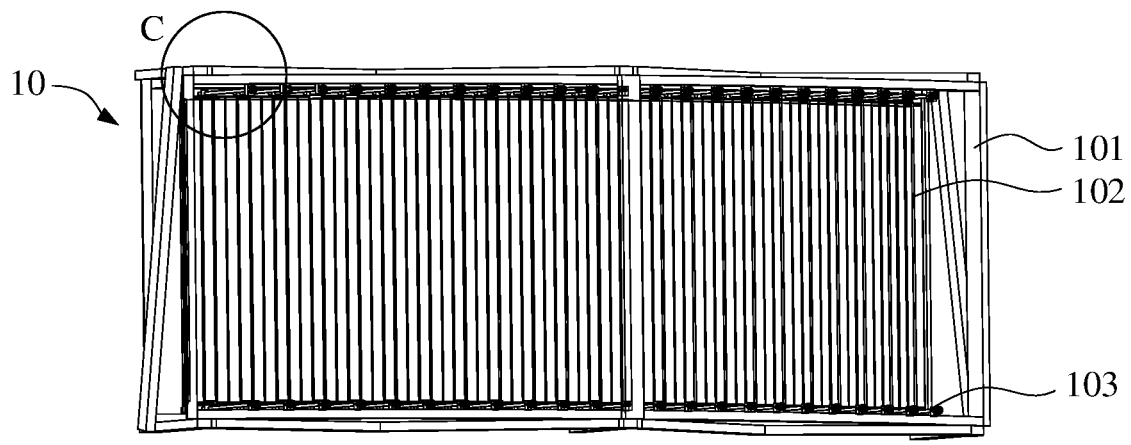
FIG. 6 is a schematic structural diagram of a back side of the verification fixture of the curved screen according to an embodiment of the present disclosure.
Figure 7:
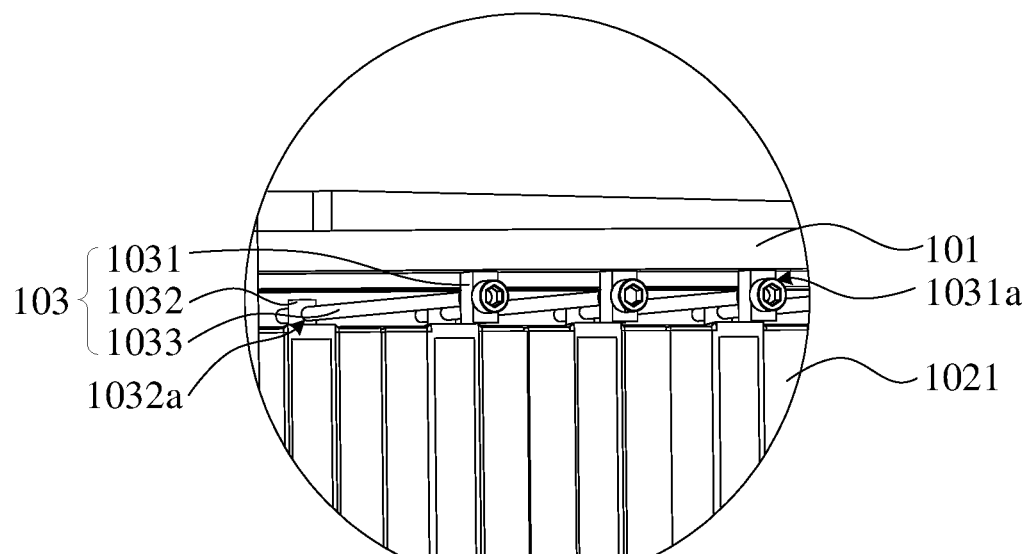
FIG. 7 is a schematic enlarged diagram of a site C in FIG. 6.
Figure 8:
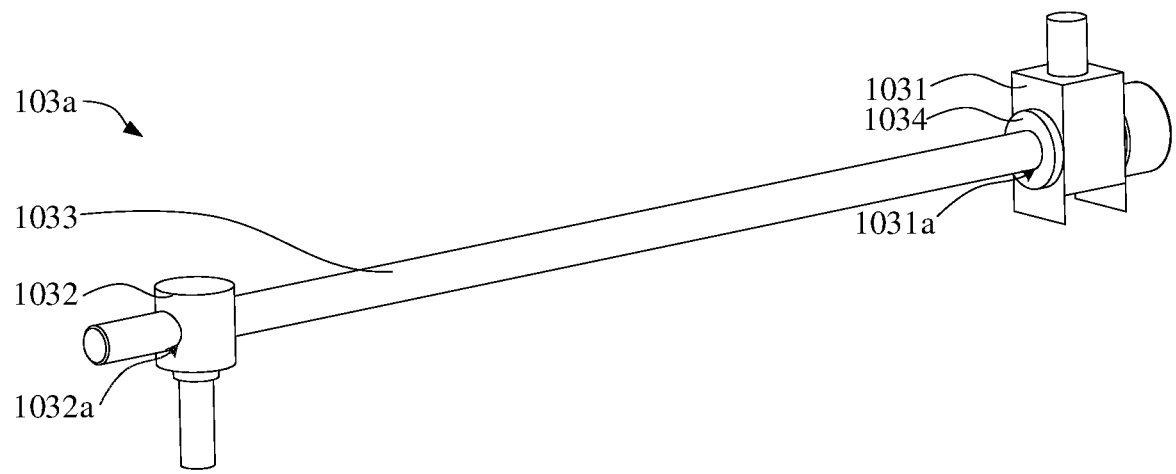
FIG. 8 is a schematic structural diagram of adjusting blocks of the verification fixture of the curved screen according to an embodiment of the present disclosure.

Referring to FIGS. 6 to 8, FIG. 6 is a schematic structural diagram of a back side of the verification fixture of the curved screen according to an embodiment of the present disclosure, FIG. 7 is a schematic enlarged diagram of a site C in FIG. 6, and FIG. 8 is a schematic structural diagram of adjusting blocks of the verification fixture of the curved screen according to an embodiment of the present disclosure. The adjusting module 103 includes a plurality of adjusting blocks 103a arranged in sequence. The adjusting blocks 103a are correspondingly disposed on two ends of the backlight blocks 1021. Each of the adjusting blocks 103a includes a first fixing part 1031, a second fixing part 1032, and an adjusting part 1033. The first fixing part 1031 is connected to the support structure 101. The second fixing part 1032 is connected to the backlight blocks 1021. The adjusting part 1033 connects the first fixing part 1031 to the second fixing part 1032 and adjusts a spacing between the first fixing part 1031 and the second fixing part 1032.

Wherein, the adjusting part 1033 is one of a threaded part, a gear set, a telescopic rod, or scissor stays. For example, the adjusting part 1033 is the telescopic rod, the telescopic rod includes a casing and a support rod, the support rod connects the support structure 101 to the backlight blocks 1021, and the support rod is movably connected to the casing and can be telescopic. The adjusting part 1033 adjusts the spacing between the first fixing part 1031 and the second fixing part 1032 to control a relative distance between the support structure 101 and the backlight blocks 1021. It can be understood that the above example of the adjusting part 1033 is only an example, and is not a limitation to the present disclosure. In order to better understand the technical solution of the present disclosure, in the drawings of the present disclosure, the threaded part is used as the adjusting part 1033 for description.

Specifically, the first fixing part 1031 includes a first connecting hole 1031a. The second fixing part 1032 includes a second connecting hole 1032a. The adjusting part 1033 is connected to the first fixing part 1031 by the first connecting hole 1031a and is connected to the second fixing part 1032 by the second connecting hole 1032a. The adjusting part 1033 is threadedly connected to at least one of the first connecting hole 1031a or the second connecting hole 1032a.

The support structure 101 is connected to the backlight module 102 by a plurality of adjusting parts 1033 which are densely arranged, and each of the adjusting parts 1033 corresponds to each of the backlight blocks 1021, respectively. The relative distance between the backlight blocks 1021 and the support structure 101 is adjusted by spinning and pushing the adjusting part, and the bending curve of the backlight module 102 can be controlled, thereby realizing real-time adjustment of the bending curve of the verification fixture 10 of the curved screen. Therefore, a dynamic observation during the test can be realized, and changes of black mura can be tested in real time, thereby obtaining a law of changes in black mura. When a test result is the optimal, a backlight curvature at this time can be determined to be an optimal curvature of the curved display panel.

In order to better describe a structure of the adjusting module 103, please refer to FIG. 8. Wherein, the adjusting module 103 further includes circlips 1034. Each of the circlips 1034 is disposed on one side of the first fixing part 1031 or the second fixing part 1032. Each of the circlips 1034 is sleeved on the adjusting part 1033. In FIG. 8, a circlip 1034 being disposed on the side of the first fixing part 1031 is illustrated.

Wherein, the circlip 1034 is also called a retaining ring or a buckle. The circlip 1034 is a kind of fasteners, which can be installed in a shaft groove or a hole of machines and equipments to prevent an axial movement of parts on a shaft or the hole. In the present disclosure, the circlip 1034 is disposed on the side of the first fixing part 1031 or the second fixing part 1032 for preventing the adjusting part 1033 from having the axial movement.

The first fixing part 1031 is installed on the support structure 101 and corresponds to the second fixing part 1032 installed on the backlight blocks 1021 by one to one. The second connecting hole 1032a on the second fixing part 1032 is coaxial with the first connecting hole 1031a on the first fixing part 1031.

The first connecting hole 1031a is a through-hole, and the second connecting hole 1032a is a threaded hole. Specifically, the adjusting part 1033 penetrates through the through-hole on the first fixing part 1031 and twists into the threaded hole on a corresponding second fixing part 1032. The circlip 1034 is installed on the adjusting part 1033 to ensure that the adjusting part 1033 can rotate along a top through-hole of the first fixing part 1031 without having a relative axial movement. At this time, rotating the adjusting parts 1033 in different positions can change the positions of corresponding backlight blocks 1021, thereby realizing a controllable curve change on the backlight module 102.

In the above description, the first connecting hole 1031a being the through-hole and the second connecting hole 1032a being the threaded hole are taken as an example. In fact, it may also be that the first connecting hole 1031a is the threaded hole, the second connecting hole 1032a is the through-hole, and the circlip 1034 is disposed on the side of the second fixing part 1032. Or it may be that the first connecting hole 1031a is the through-hole, the second connecting hole 1032a is the threaded hole, a nut is disposed on one side of the first connecting hole 1031a away from the second fixing part 1032 to tighten or loosen the adjusting part 1033, and the circlip 1034 is disposed on the side of the first fixing part 1031. The present disclosure does not limit types of the first connecting hole 1031a and the second connecting hole 1032a and a position of the circlip 1034, as long as the positions of the backlight blocks 1021 can be adjusted.

Figure 9:
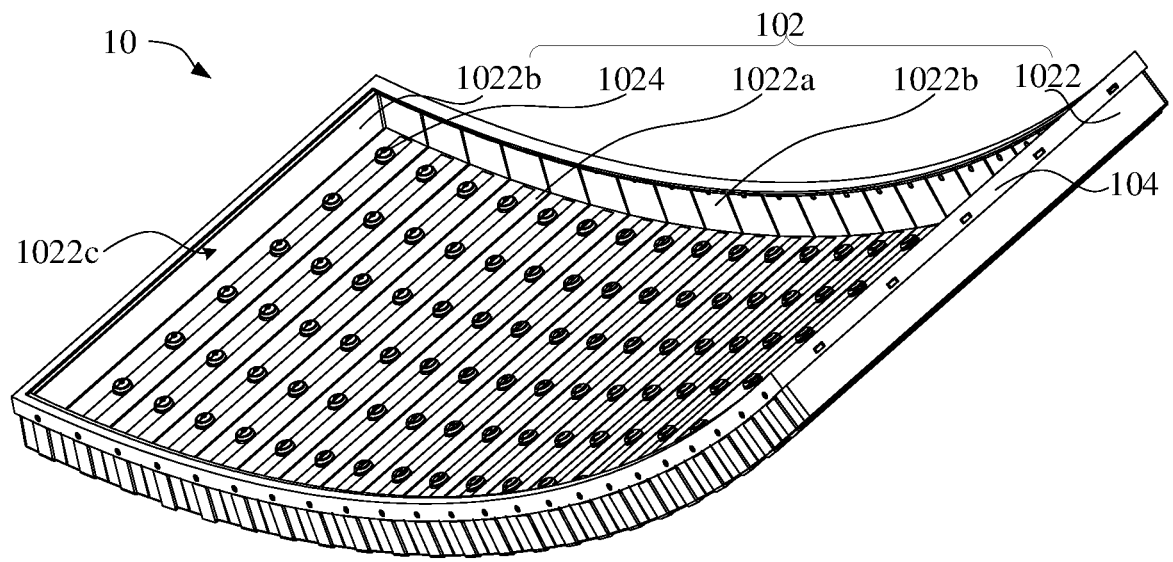
FIG. 9 is a third schematic structural diagram of the backlight module of the verification fixture of the curved screen according to an embodiment of the present disclosure.
Figure 10:
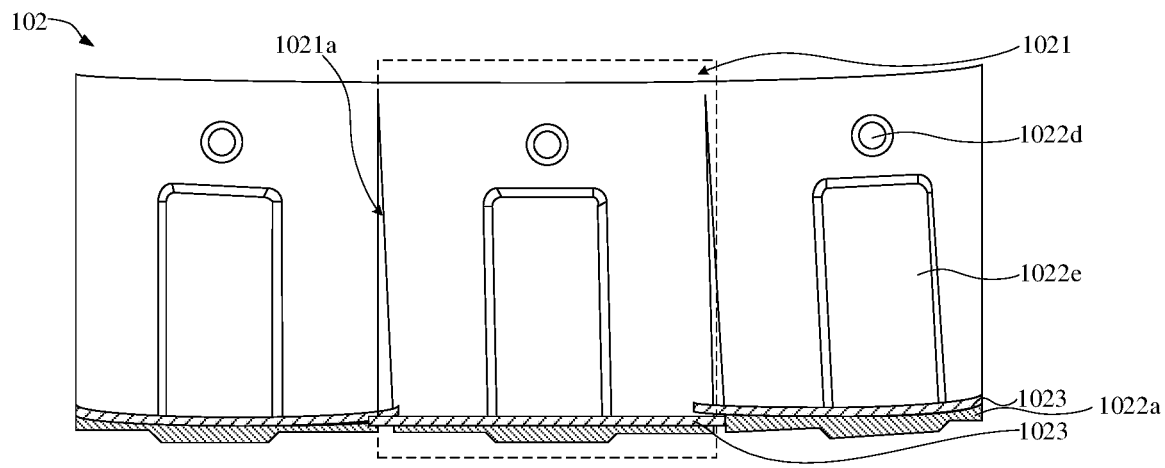
FIG. 10 is a schematic cross-sectional structural diagram of the backlight module of the verification fixture of the curved screen according to an embodiment of the present disclosure.

Referring to FIGS. 9 and 10, FIG. 9 is a third schematic structural diagram of the backlight module of the verification fixture of the curved screen according to an embodiment of the present disclosure, and FIG. 10 is a schematic cross-sectional structural diagram of the backlight module of the verification fixture of the curved screen according to an embodiment of the present disclosure. Wherein, each of the backlight blocks 1021 includes a back frame 1022, a reflective sheet 1023, and a light source 1024. The back frame 1022 has a bottom plate 1022a and side walls 1022b. The reflective sheet 1023 is disposed on the bottom plate 1022a.

The light source 1024 is disposed on one side of the reflective sheet 1023 away from the bottom plate 1022a.

Wherein, the back frame 1022 forms an outer contour of the backlight blocks 1021. The back frame 1022 includes the bottom plate 1022a and the side walls 1022b, and the side walls 1022b and the bottom plate 1022a combine with each other to form the back frame 1022. The side walls 1022b and the bottom plate 1022a form an accommodation space 1022c, and the reflective sheet 1023 and the light source 1024 are disposed in the accommodation space 1022c.

Wherein, the backlight blocks 1021 on two sides of the backlight module each have one bottom plate 1022a and three side walls 1022b, and the backlight blocks 1021 on other positions of the backlight module each have one bottom plate 1022a and two side walls 1022b.

Wherein, the side walls 1022b are provided with connecting holes 1022d. The second fixing part 1032 passes through the connecting holes 1022d and fixedly connects to the backlight blocks 1021. The bottom plate 1022a and the side walls 1022b may be provided with continuous grooves 1022e. The light source 1024 is attached into the continuous grooves 1022e, and a length and a width of the continuous grooves 1022e correspond to a length and a width of the light source 1024, respectively. By disposing the continuous grooves 1022e on the bottom plate 1022a and the side walls 1022b, a position of the light source 1024 can be fixed better, thereby preventing the light source 1024 from being offset during bending and causing uneven light extraction.

It should be noted that when the backlight blocks 1021 include the connecting parts and the separation parts, bottom plates 1022a of adjacent backlight blocks 1021 are separated from each other, and the side walls 1022b connected to the bottom plates 1022a are also separated from each other, thereby forming an external structure of the separation parts. A gap formed by separation of the bottom plates 1022a corresponds to a gap 1021a formed by separation of the side walls 1022b. The side walls 1022b of the backlight blocks 1021 have the connecting parts far away from the bottom plates 1022a. The connecting parts on the two adjacent backlight blocks 1021 are an integrated structure. In addition, the bottom plate 1022a and the side walls 1022b may be an integrated structure. Since one end of the side walls 1022b is connected to each other to form the connecting parts and another end thereof is separated from each other to form the external structure of the separation parts with the bottom plates 1022a, the connecting parts and the separation parts are the integrated structure.

In some embodiments, the back frame 1022 may be a metal shell, such as magnesium alloy, stainless steel, or other metals. It should be noted that a material of the back frame 1022 in the embodiment of the present disclosure is not limited to this, and it can also use other materials. For example, the back frame 1022 may be a plastic shell, a glass shell, or a ceramic shell. Or the back frame 1022 may include a plastic part and a metal part to form a shell structure composed of metals and plastics. Specifically, the metal part can be formed first, for example, a metal alloy substrate may be formed by injection, and then a plastic substrate is formed by injecting plastics on a magnesium alloy substrate to constitute a complete shell structure. It should be noted that the material and a manufacturing process of the back frame 1022 are not limited to this. The back frame 1022 has good strength and will not be deformed by external forces. When performing a test on the curved screen, an initial curve of the back frame 1022 is an arc shape that satisfies three points forming a target radius of curvature.

Specifically, the reflective sheet 1023 is configured to reflect light emitted from the light source 1024 to the light-emitting sides, thereby improving utilization of light.

Referring to FIG. 10, in the gap 1021a between the two adjacent backlight blocks 1021, reflective sheets 1023 corresponding to the two adjacent backlight blocks 1021 overlap each other.

In order to allow the backlight blocks 1021 to bent in a small range, in the gap 1021a between the two adjacent backlight blocks 1021, the reflective sheets 1023 corresponding to the two adjacent backlight blocks 1021 are set to overlap each other. In splicing and overlapping settings, a width of the reflective sheets 1023 matches a width of each section of the backlight blocks 1021. This setting can allow overlapping parts of the reflective sheets 1023 to slide relative to each other when bending, so adjacent reflective sheets 1023 will not be separated from each other and generate a gap, thereby preventing light leakage.

Specifically, the light source 1024 may be a point light source or a strip light source. In FIG. 9, a light strip connected by light-emitting diodes being the light source is taken as an example for description. Light sources 1024 are distributed uniformly and fixed in each of the backlight blocks 1021. This setting can ensure that the light sources 1024 can be bent in the small range with the backlight blocks 1021 and can also maintain a relatively uniform arrangement under various bending curves, thereby ensuring uniformity of backlight.

Figure 11:
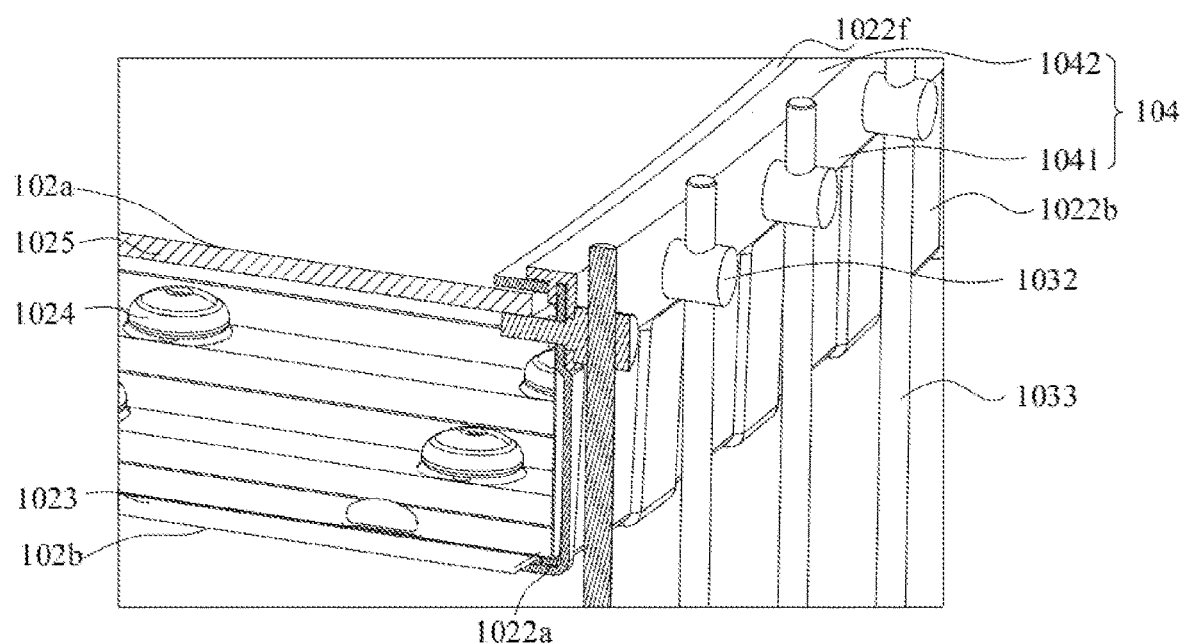
FIG. 11 is a partial schematic cross-sectional structural diagram of the verification fixture of the curved screen according to an embodiment of the present disclosure.

Referring to FIG. 11, FIG. 11 is a partial schematic cross-sectional structural diagram of the verification fixture of the curved screen according to an embodiment of the present disclosure. Wherein, the backlight module 102 further includes a diffusion sheet 1025. The diffusion sheet 1025 is disposed on a light-emitting side 102a of the backlight module 102. The diffusion sheet 1025 covers the backlight blocks 1021 with a whole surface, and using the diffusion sheet 1025 to cover all backlight blocks 1021 can meet needs of optical mixing. It should be noted that in order to clearly show a setting of the diffusion sheet 1025, other components cannot be fully shown in FIG. 11, and please refer to other drawings.

The diffusion sheet 1025 has many granular objects, which can diffuse light emitted from the light sources 1024 and transmit the light to the light-emitting side 102a of the backlight module 102, thereby broadening viewing angles. Other optical films may also be disposed on the light-emitting side 102a of the backlight module 102, such as a prism film (which is not shown in FIG. 11). The prism film may be disposed on one side of the diffusion sheet 1025 away from the light sources 1024. The prism film can gather diffused light within a certain angle to improve brightness.

Referring to FIG. 11, the verification fixture 10 of the curved screen further includes a middle frame 104. The middle frame 104 has a first side frame 1041 and a second side frame 1042 perpendicularly connected to each other. The first side frame 1041 is disposed on the side walls 1022b. The second fixing part 1032 of the adjusting blocks 103a penetrates through the first side frame 1041 to connect to the backlight module 102. The second side frame 1042 is disposed on one side of the backlight module 102 away from the support structure 101. A gap is defined between the second side frame 1042 and the backlight module 102.

In FIG. 11, the adjusting part 1033 being the threaded part is taken as an example for description. The second fixing part 1032 may pass through the first side frame 1041 of the middle frame 104 to correspondingly connect to the backlight blocks 1021. At a same time, a front end of the second fixing part 1032 may be configured to carry the diffusion sheet 1025.

Wherein, the backlight module 102 includes a protruding part 1022*f*. The protruding part 1022*f* is disposed in parallel to the second side frame. The protruding part 1022*f* is disposed on one side of the middle frame 104 adjacent to the bottom plate 1022*a*. the diffusion sheet 1025 may be fixed between the protruding part 1022*f* and one end of the second fixing part 1032. Wherein, there is a gap between the middle frame 104 and the backlight module 102 in a bending direction, so that partial bending of the backlight module 102 will not be transferred to the middle frame 104, thereby preventing the middle frame 104 from affecting bending of the backlight module 102.

Wherein, a material of the middle frame 104 is plastics. Since the plastics have flexibility, when the backlight module 102 is bent, plastic flexibility of the middle frame 104 can be bent into a smooth curve with the partial bending of the backlight module 102, thereby being convenient for attachment of the curved display panel. In addition, the bending of the backlight module 102 drives the middle frame 104 to bend into a smooth curvature, and the smooth curvature is a real-time verified curvature of the backlight. When performing the test on the curved screen, the curved display panel may be attached to the middle frame by the double-sided foam glue. Then the backlight module 102 is powered on and lit up, and the adjusting part 1033 is adjusted to change the curve of the backlight module 102, so black mura can be observed and tested in real time. After an optimal curve is obtained, a curve of the curved display panel at this time is measured and is an optimal curve needed.

Figure 12:
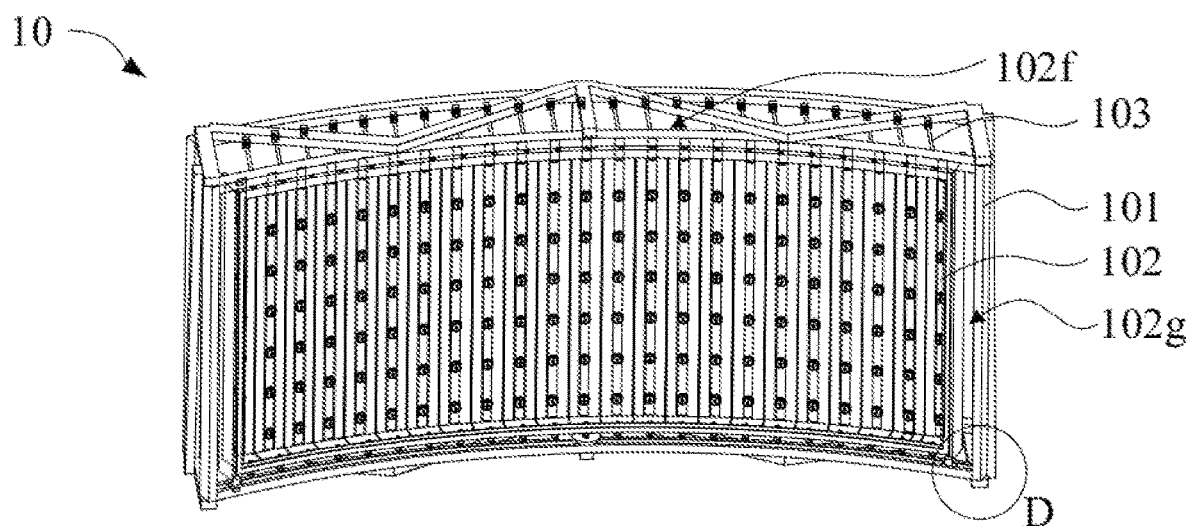
FIG. 12 is a second schematic structural diagram of the verification fixture of the curved screen according to an embodiment of the present disclosure.
Figure 13:
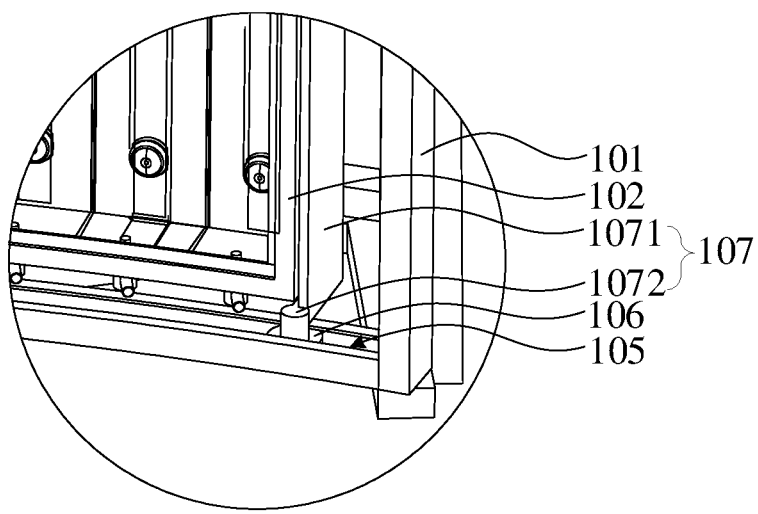
FIG. 13 is a schematic enlarged diagram of a site D in FIG. 12.

Referring to FIGS. 12 and 13, FIG. 12 is a second schematic structural diagram of the verification fixture of the curved screen according to an embodiment of the present disclosure, and FIG. 13 is a schematic enlarged diagram of a site D in FIG. 12. Wherein, the verification fixture 10 of the curved screen further includes a slide rail 105, a bearing 106, and an adapter bracket 107. The backlight module 102 includes a bending side 102*f* and a fixing side 102*g*. A bottom bracket of the backlight module 102 is fixedly connected to the slide rail 105. The slide rail 105 is disposed in parallel to the bending side 102*f*. The bearing 106 is disposed in the slide rail 105. The adapter bracket 107 connects the fixing side 102*g* and the bearing 106.

Wherein, the adapter bracket 107 includes a first part 1071 and a second part 1072. The first part 1071 is embedded into the bearing 106. The second part 1072 is attached to the backlight module 102. Specifically, the first part 1071 and the second part 1072 may be an integrated structure.

When performing the test on the curved screen, a middle part of the backlight module 102 is fixedly connected to the slide rail 105 and cannot be moved. Two ends of the backlight module 102 pass through the bearing 106 and the adapter bracket 107 to realize movable connections with the slide rail 105. Therefore, the two ends of the backlight module 102 can slide relative to each other along the slide rail 105. Therefore, requirements of the three points forming the target curvature can be ensured while ensuring changes of the curve of the backlight module 102.

It can be understood that the slide rail 105 is manufactured using a material having a certain elasticity. Therefore, a default target curvature of the verification fixture 10 of the curved screen of the present disclosure is adjustable, and it can prevent a shape of the slide rail 105 from limiting the backlight module 102 when adjusting the target curvature.

Therefore, the present disclosure provides the verification fixture 10 of the curved screen. The verification fixture 10 of the curved screen can perform multiple groups of black mura tests of bending curves while ensuring the three points forming the target curvature of the backlight module 102. After the backlight module 102 is lit up, backlights having multiple groups of bending curves are simulated by partial flexible designs of the backlight module 102. Specifically, the support structure 101 is connected to the backlight module 102 by the plurality of adjusting parts 1033 which are densely arranged. The adjusting module 103 adjusts relative positions of the backlight blocks 1021 arranged in sequence in the backlight module 102 and the support structure 101 to control the changes of the curve of the backlight module 102. In addition, the adjusting module 103 drives the middle frame 104 to bend into the smooth curvature, and the smooth curvature is the real-time verified curvature of the backlight. In the verification fixture 10 of the curved screen, corresponding structural optical parts such as the reflective sheet 1023 and the diffusion sheet 1025 are also designed correspondingly. Therefore, the verification fixture 10 of the curved screen can realize adjusting the curve in real time, thereby realizing the dynamic observation and the test of the changes and the law of changes of black mura. When display of the curved display panel is adjusted to an optimal situation, the bending curve of the backlight module 102 at this time can be determined. The verification fixture 10 of the curved screen provided in the present disclosure can effectively solve problems of complicated verification solutions, long verification cycles, and high verification costs.

The verification fixture of the curved screen provided by the embodiments of the present disclosure are described in detail above. Specific examples are used herein to explain the principles and implementation of the present disclosure. The descriptions of the above embodiments are only used to help understand the method of the present disclosure and its core ideas; meanwhile, for those skilled in the art, the range of specific implementation and application may be changed according to the ideas of the present disclosure. In summary, the content of the specification should not be construed as causing limitations to the present disclosure.

What is claimed is:

1. A verification fixture of a curved screen, comprising:
   a support structure;
   a backlight module disposed on the support structure and comprising a plurality of backlight blocks arranged in sequence, wherein light-emitting sides of two adjacent backlight blocks are connected to each other, and backlight sides of the two adjacent backlight blocks are separated from each other; and
   an adjusting module connecting the backlight module to the support structure and adjusting a bending degree of the backlight module.

2. The verification fixture of the curved screen according to claim 1, wherein the backlight blocks comprise connecting parts and separation parts, the connecting parts are disposed on light-emitting sides of the separation parts, each of the connecting parts is disposed between two adjacent separation parts, the two adjacent separation parts are rotationally connected to each other by each of the connecting parts, and the separation parts and the connecting parts are an integrated structure.

3. The verification fixture of the curved screen according to claim 1, wherein a connector is disposed between the two adjacent backlight blocks, and the two adjacent backlight blocks are rotationally connected to each other by the connector.

4. The verification fixture of the curved screen according to claim 3, wherein the connector is a hinge structure.

5. The verification fixture of the curved screen according to claim 1, wherein the adjusting module comprises a plurality of adjusting blocks arranged in sequence, and the adjusting blocks are correspondingly disposed on two ends of the backlight blocks; and each of the adjusting blocks comprises a first fixing part, a second fixing part, and an adjusting part, the first fixing part is connected to the support structure, the second fixing part is connected to the backlight blocks, and the adjusting part connects the first fixing part to the second fixing part and is configured to adjust a spacing between the first fixing part and the second fixing part.

6. The verification fixture of the curved screen according to claim 5, wherein the adjusting part is one of a threaded part, a gear set, a telescopic rod, or scissor stays.

7. The verification fixture of the curved screen according to claim 5, wherein the first fixing part comprises a first connecting hole, the second fixing part comprises a second connecting hole, the adjusting part is connected to the first fixing part by the first connecting hole and is connected to the second fixing part by the second connecting hole, and at least one of the first connecting hole or the second connecting hole is threadedly connected to the adjusting part.

8. The verification fixture of the curved screen according to claim 7, wherein the first connecting hole is coaxial with the second connecting hole.

9. The verification fixture of the curved screen according to claim 5, wherein each of the adjusting blocks further comprises a circlip disposed on one side of the first fixing part or the second fixing part, and the circlip is sleeved on the adjusting part.

10. The verification fixture of the curved screen according to claim 9, wherein the first connecting hole is a through-hole, the second connecting hole is a threaded hole, a nut is disposed on one side of the first connecting hole away from the second fixing part and configured to tighten or loosen the adjusting part, and the circlip is disposed on the side of the first fixing part.

11. The verification fixture of the curved screen according to claim 1, wherein each of the backlight blocks comprises a back frame, a reflective sheet, and a light source; the back frame comprises a bottom plate and side walls, the bottom plate and the side walls form an accommodation space, and the reflective sheet and the light source are disposed in the accommodation space; and the reflective sheet is disposed on the bottom plate, and the light source is disposed on one side of the reflective sheet away from the bottom plate.

12. The verification fixture of the curved screen according to claim 11, wherein in a gap between the two adjacent backlight blocks, reflective sheets corresponding to the two adjacent backlight blocks overlap each other.

13. The verification fixture of the curved screen according to claim 11, wherein the backlight module further comprises a diffusion sheet disposed on a light-emitting side of the backlight module and covering the backlight blocks with a whole surface.

14. The verification fixture of the curved screen according to claim 13, further comprising a middle frame having a first side frame and a second side frame perpendicularly connected to each other, the first side frame is disposed on the side walls, the adjusting module penetrates through the first side frame to connect to the backlight module, the second side frame is disposed on one side of the backlight module away from the support structure, and a gap is defined between the second side frame and the backlight module.

15. The verification fixture of the curved screen according to claim 14, wherein the adjusting module comprises a plurality of adjusting blocks arranged in sequence, and the adjusting blocks are correspondingly disposed on two ends of the backlight blocks; each of the adjusting blocks comprises a first fixing part, a second fixing part, and an adjusting part, the first fixing part is connected to the support structure, the second fixing part is connected to the backlight blocks, and the adjusting part connects the first fixing part to the second fixing part and is configured to adjust a spacing between the first fixing part and the second fixing part; and the second fixing part penetrates through the first side frame to connect to the backlight module.

16. The verification fixture of the curved screen according to claim 15, wherein the backlight module comprises a protruding part disposed in parallel to the second side frame, the protruding part is disposed on one side of the middle frame adjacent to the bottom plate, and the diffusion sheet is fixed between the protruding part and one end of the second fixing part.

17. The verification fixture of the curved screen according to claim 11, wherein the bottom plate and the side walls are provided with continuous grooves, and the light source is attached into the continuous grooves.

18. The verification fixture of the curved screen according to claim 1, further comprising a slide rail, a bearing, and an adapter bracket, wherein the backlight module comprises a bending side and a fixing side, a bottom bracket of the backlight module is fixedly connected to the slide rail, the slide rail is disposed in parallel to the bending side, the bearing is disposed in the slide rail, and the adapter bracket connects the fixing side and the bearing.

19. The verification fixture of the curved screen according to claim 18, wherein the adapter bracket comprises a first part and a second part, the first part is embedded into the bearing, and the second part is attached to the backlight module.

20. The verification fixture of the curved screen according to claim 19, wherein the first part and the second part are an integrated structure.

* * * * *